United States Patent [19]
Lee et al.

[11] Patent Number: 5,870,076
[45] Date of Patent: Feb. 9, 1999

[54] PIXEL DATA CORRECTION APPARATUS FOR USE WITH AN ACTUATED MIRROR ARRAY

[75] Inventors: Geun-Woo Lee; Eui-Jun Kim, both of Seoul, Rep. of Korea

[73] Assignee: Daewoo Electronics, Co., Ltd., Seoul, Rep. of Korea

[21] Appl. No.: 556,113

[22] Filed: Nov. 9, 1995

[30] Foreign Application Priority Data

Nov. 11, 1994 [KR] Rep. of Korea .................. 1994-29495

[51] Int. Cl.[6] ...................................................... G09G 5/10
[52] U.S. Cl. ............................ 345/149; 345/55; 345/84; 359/224
[58] Field of Search ...................................... 345/149–151, 345/85, 55, 200, 516; 358/506, 516; 348/771, 444, 448, 745; 359/224

[56] References Cited

U.S. PATENT DOCUMENTS

| | | | |
|---|---|---|---|
| 4,868,668 | 9/1989 | Tavernetti | 348/745 |
| 4,945,406 | 7/1990 | Coke | 358/506 |
| 5,278,652 | 1/1994 | Urbanus | 345/200 |
| 5,303,055 | 4/1994 | Hendrix et al. | 348/761 |
| 5,307,056 | 4/1994 | Urbanus | 345/200 |
| 5,339,116 | 8/1994 | Urbanus et al. | 345/108 |
| 5,504,504 | 4/1996 | Markandey et al. | 345/55 |
| 5,585,956 | 12/1996 | Lee et al. | 359/224 |
| 5,657,036 | 8/1997 | Markendey | 345/85 |
| 5,670,976 | 9/1997 | Chiu et al. | 345/84 |
| 5,673,060 | 9/1997 | Blaxton et al. | 345/84 |
| 5,686,939 | 11/1997 | Millward et al. | 345/55 |
| 5,737,038 | 4/1995 | Gale et al. | 345/88 |

FOREIGN PATENT DOCUMENTS

| | | | |
|---|---|---|---|
| 0545412 | 6/1993 | European Pat. Off. | H04N 5/20 |
| 9115843 | 10/1991 | WIPO | G09G 3/20 |
| 9209064 | 5/1992 | WIPO | G09G 3/34 |
| WO 92/09064 | 5/1992 | WIPO | G09G 3/34 |

*Primary Examiner*—Amare Mengistu
*Attorney, Agent, or Firm*—Pennie & Edmonds LLP

[57] ABSTRACT

A pixel data correction apparatus, which corrects the value of an input pixel using a predetermined corrected value of its corresponding actuated mirror in an array of M×N actuated mirrors, comprises a first corrector for gamma-correcting the value of the input pixel; a memory for storing a predetermined set of corrected values for said M×N actuated mirrors; an address data generator for generating address data representing the location of the input pixel; a circuit, responsive to the generated address data for the input pixel, for retrieving a predetermined corrected value from the corrected values of the stored predetermined set; and a second corrector for correcting the gamma-corrected value of the input pixel using the retrieved corrected value to thereby provide a corrected output pixel value.

12 Claims, 3 Drawing Sheets

PIXEL DATA CORRECTION APPARATUS FOR USE WITH AN ACTUATED MIRROR ARRAY

FIELD OF THE INVENTION

The present invention relates to a pixel data correction apparatus for use with an actuated mirror array (AMA) included in an optical projection system; and, more particularly, to an apparatus for correcting a value of each of input pixels using a predetermined corrected value of its corresponding actuated mirror.

DESCRIPTION OF THE PRIOR ART

Among the various video display systems available in the art, an optical projection system is known to be capable of providing high quality images in a large scale. In such an optical projection system, light from a lamp is uniformly illuminated onto, e.g., an array of M×N mirrors. As illustrated in FIG. 3, the array of M×N mirrors is mounted on an array of actuators which includes a corresponding number, i.e., M×N, of actuators such that each of the mirrors is coupled with each of the actuators to thereby form an AMA, wherein each of the actuated mirrors corresponds to a pixel. The actuators may be made of an electrodisplacive material such as a piezoelectric or an electrostrictive material which deforms in response to a supply voltage applied thereto.

The reflected light beam from each of the mirrors is incident upon an aperture of a baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon. An optical projection system employing such an AMA is disclosed in a commonly owned U.S Pat. No. 5,585,956, entitled "ELECTROSTRICTIVE ACTUATED MIRROR ARRAY".

In the optical projection system utilizing an AMA, the mirror for reflecting the light beam in each of the actuated mirrors in the array should be parallel to the surface of a panel on which the AMA is mounted when no electrical signal is applied thereto. However, some of the mirrors may not be parallel to the surface, preventing the mirrors from reflecting the light beam accurately, which may, in turn, lead to a deterioration in picture quality.

SUMMARY OF THE INVENTION

It is, therefore, a primary object of the present invention to provide an apparatus, for use with an actuated mirror array included in an optical projection system, capable of correcting a value of an input pixel corresponding to a mirror which is not aligned in parallel to the surface of a panel on which the array is mounted.

In accordance with the present invention, there is provided an apparatus, for use with an actuated mirror array included in an optical projection system, for correcting the value of an input pixel using a predetermined corrected value of its corresponding actuated mirror within M×N actuated mirrors included in the array, wherein M and N are integers, which comprises:

means for gamma-correcting the value of the input pixel;

means for storing a predetermined set of corrected values for said M×N actuated mirrors;

means for generating address data representing the location of the input pixel;

means, responsive to the generated address data for the input pixel, for retrieving a predetermined corrected value from the corrected values of the stored predetermined set; and means for correcting the gamma-corrected value of the input pixel using the retrieved corrected value to thereby provide a corrected output pixel value.

BRIEF DESCRIPTION OF THE DRAWINGS

The present invention together with the above and other objects and advantages will become apparent from the following description of preferred embodiments given in conjunction with the accompanying drawings, wherein.

DETAILED DESCRIPTION OF THE PREFERRED EMBODIMENTS

Figure 1:
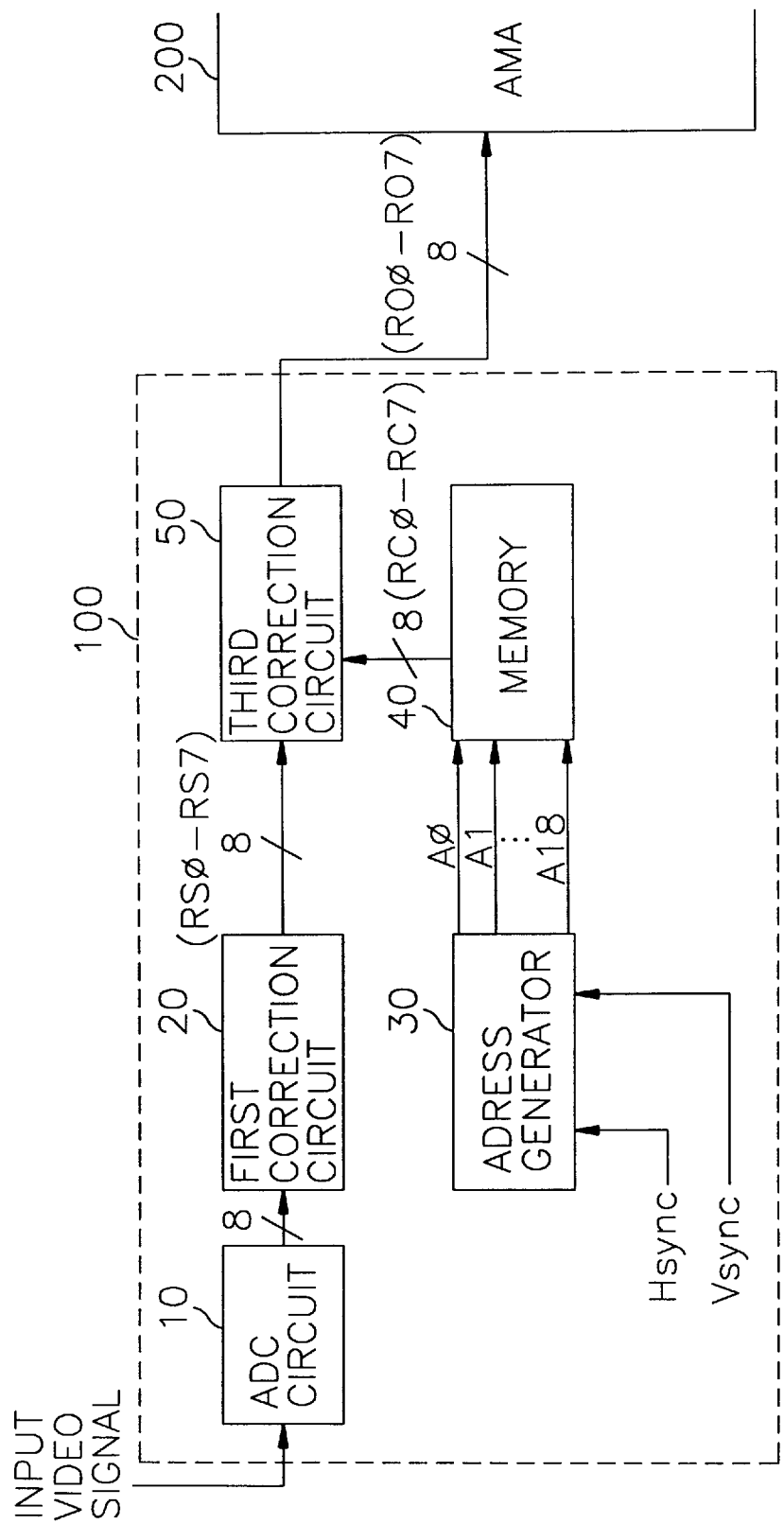
FIG. 1 shows a block diagram illustrating a novel pixel data correction apparatus for use with an AMA in accordance with the present invention.

In FIG. 1, there is illustrated a block diagram of the novel pixel data correction apparatus 100 in accordance with the present invention for use with an AMA 200 in an optical projection system. The pixel data correction apparatus 100 comprises an analog to digital conversion (ADC) circuit 10, a first, and a third correction circuits 20, 50, a memory 40 and an address generator 30.

An input analog video signal of M×N, e.g., 640×480, pixels is applied to the ADC circuit 10 which is adapted to convert each input analog video signal into corresponding digital video pixel data of S, e.g., 8, bits by employing a conventional ADC algorithm, wherein M, N and S are integers. For the sake of simplicity, the following description of the inventive apparatus will be given with respect to the 8-bit digital video pixel data. The converted 8-bit digital video pixel data from the ADC circuit 10 is then fed to the first correction circuit 20.

At the first correction circuit 20, in response to the 8-bit digital video pixel data from the ADC circuit 10, a corresponding 8-bit corrected pixel data, e.g., (RS0–RS7), is read out from a set of corrected pixel data prestored in a read only memory (ROM) (not shown) thereof. The set of corrected pixel data prestored in the ROM can be derived by employing a conventional gamma correction algorithm well known in the art. The 8-bit gamma-corrected pixel data (RS0–RS7) read out from the ROM of the first correction circuit 20 is then coupled to the third correction circuit 50 in a parallel fashion.

In the meantime, as shown in FIG. 1, a horizontal and a vertical synchronization (SYNC) signals, Hsync and Vsync, provided from a SYNC signal separator (not shown) are applied to the address generator 30. Using the horizontal and the vertical SYNC signals, Hsync and Vsync, the address generator 30 serves to generate P, e.g., 19, bit address data, e.g., (A0–A18), representing the location of the input pixel applied to the ADC circuit 10, wherein P is a positive integer.

Again, the following description will be given with respect to the 19-bit address data for the sake of simplicity. The 19-bit address data (A0–A18) for the input pixel generated at the address generator 30 is then supplied to the memory 40.

In response to the 19-bit address data (A0–A18) for the input pixel supplied from the address generator 30, the memory 40 serves to retrieve the 8-bit corrected value, e.g., (RC0–RC7), for an actuated mirror which corresponds to the input pixel from a set of corrected values for M×N actuated mirrors prestored in a ROM thereof. The set of corrected values for M×N actuated mirrors prestored in the ROM can be obtained through the use of a known mirror angle estimation equipment.

In each of the corrected values included in the set, a most significant bit (MSB), e.g., RC7, thereof represents whether its corresponding actuated mirror is tilted in a positive direction or in a negative direction, whereas the remainder, e.g., (RC0–RC6), denotes an angle of a substantially tilted actuated mirror. The set of corrected values has a range from 00000000 to 11111111, wherein the 8-bit corrected value of 00000000 represents that an actuated mirror is in a normal state, i.e., it is aligned in parallel to the surface of a panel on which the AMA is mounted. Subsequently, the 8-bit gamma-corrected pixel data (RS0–RS7) outputted from the first correction circuit 20 and the corresponding 8-bit corrected value (RC0–RC7) retrieved from the memory 40 are simultaneously coupled to the third correction circuit 50 in a parallel form.

At the third correction circuit 50, correction operation of the 8-bit gamma-corrected pixel data (RS0–RS7) for the input pixel supplied from the first correction circuit 20 is performed by employing the 8-bit corrected value (RC0–RC7) for the corresponding actuated mirror provided from the memory 40.

Figure 2:
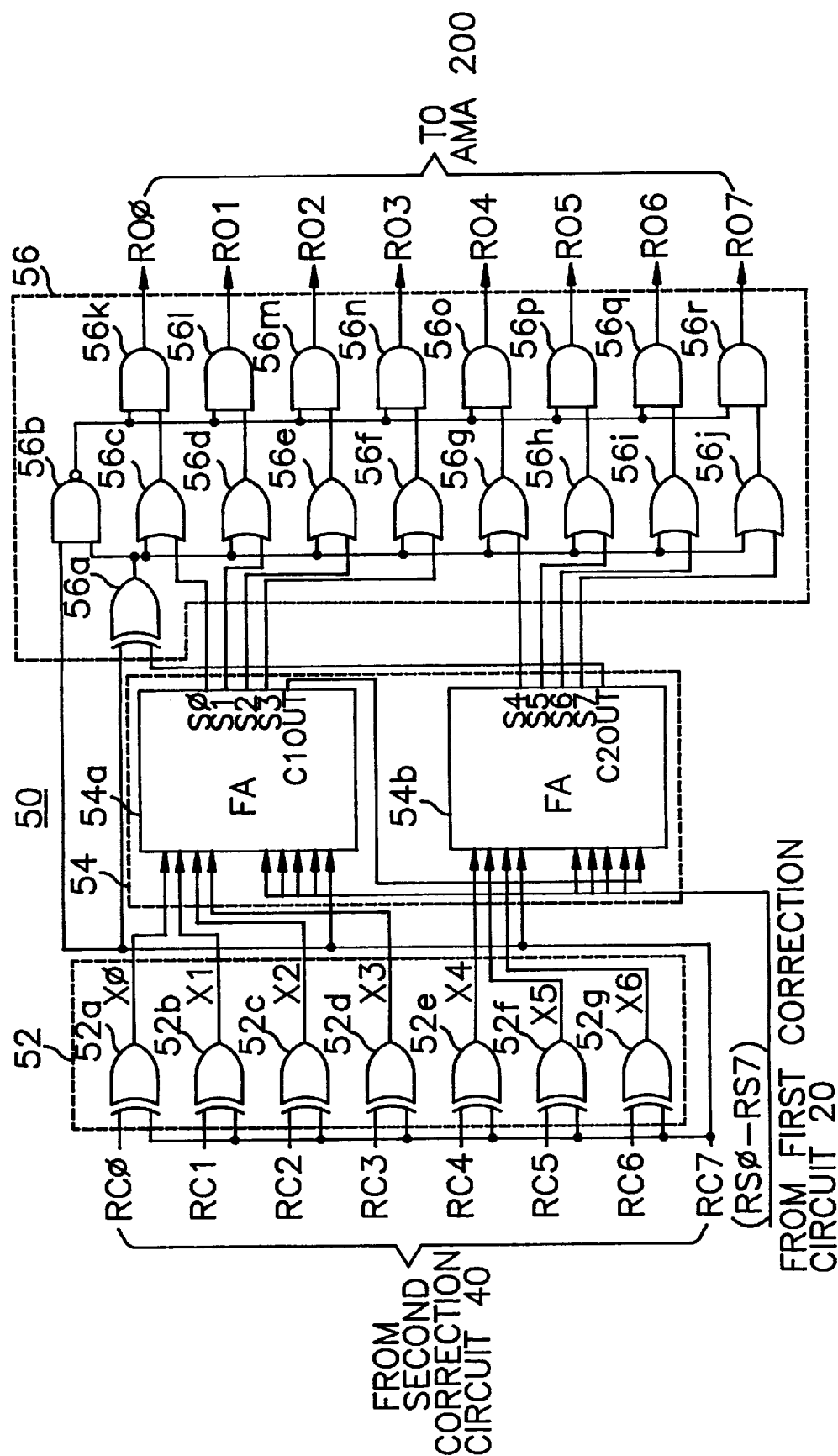
FIG. 2 provides a detailed circuit diagram of the third correction circuit shown in FIG. 1.
Figure 3:
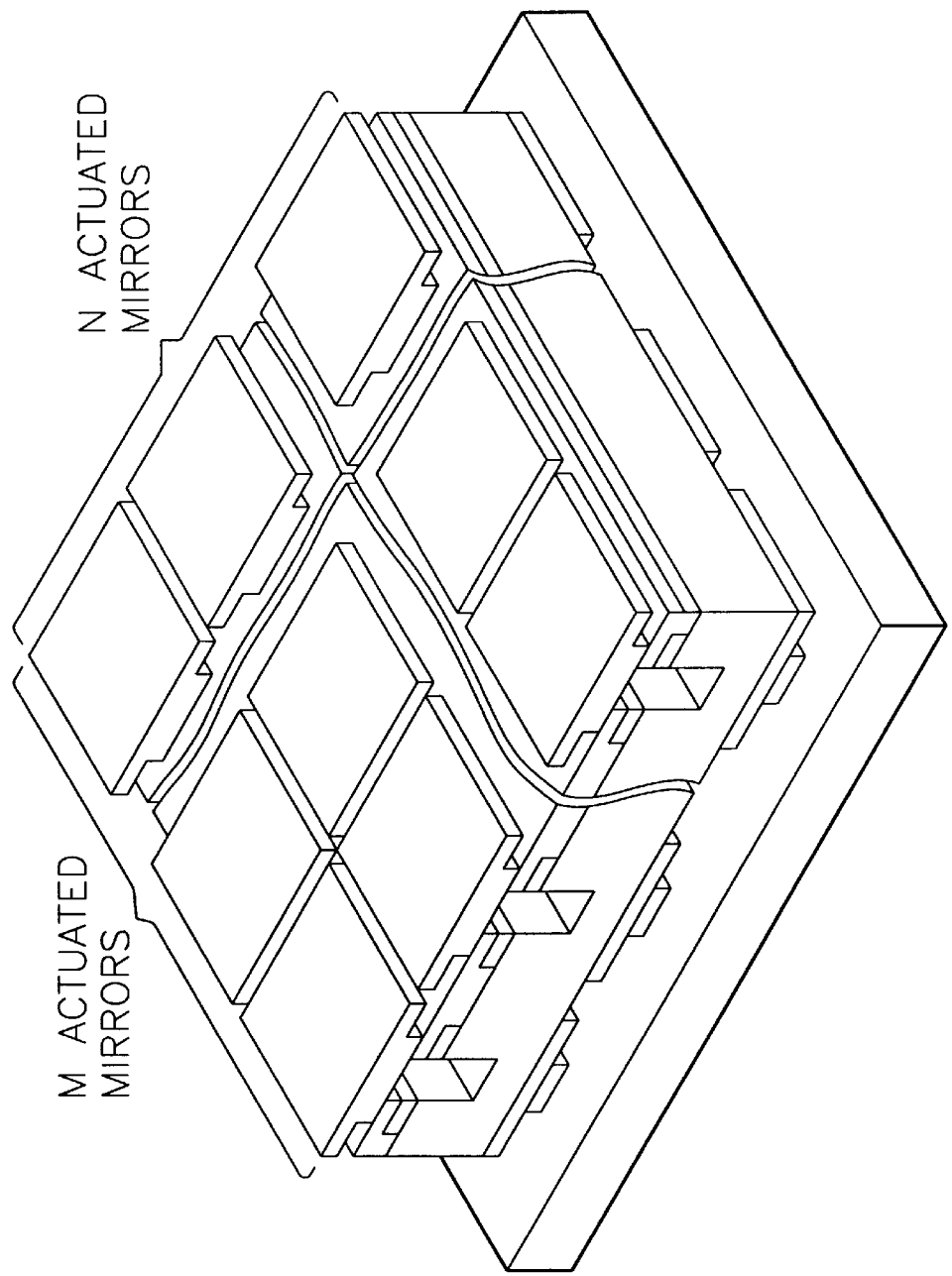
FIG. 3 illustrates a conventional M×N actuated mirror array having therein M×N actuated mirrors.

Turning now to FIG. 2, there is illustrated a detailed circuit diagram of the third correction circuit 50 shown in FIG. 1. The third correction circuit 50 comprises a sign determinator 52, a pixel data corrector 54 and a carry digit limiter 56.

As shown, the 8-bit corrected value (RC0–RC7) for the actuated mirror corresponding to the input pixel provided from the memory 40 is coupled to the sign determinator 52 in a parallel fashion. The sign determinator 52, which includes a plurality of exclusive (EX) OR gates, e.g., 52a to 52g, performs exclusive OR operation for a MSB, i.e., RC7, of the 8-bit corrected value coupled thereto and the remainder, i.e., 7 bit corrected value (RC0–RC6), respectively. Specifically, inputs to each of the EX-OR gates 52a to 52g are the MSB RC7 and a corresponding bit of remainder (RC0–RC6) except the MSB RC7 in the 8-bit corrected value.

As is well known in the art, an output from each of the EX-OR gates 52a to 52g, Xi, may be represented as follows:

$$Xi = RCi \oplus RC7 \quad (1)$$

wherein i is an integer used as an index of each of the EX-OR gates.

Thereafter, an output from each of the EX-OR gates 52a to 52g, Xi, is provided to the pixel data corrector 54 including T number of, e.g., 2, full adders (FAs), 54a and 54b, which are adapted to provide S, i.e., the 8-bit corrected output pixel data, e.g., S0 to S7, wherein T is a positive integer.

As shown in FIG. 2, inputs to the FA 54a are K, e.g., 4, bit corrected pixel data, e.g., (RS0–RS3), provided from the first correction circuit 20, K, i.e., 4, bit exclusive OR operated corrected values, e.g., X0 to X3, supplied from the EX-OR gates 52a to 52d, and the MSB RC7 of the 8-bit corrected value, as a first input carry bit, e.g., Clin, directly applied from the memory 40, wherein K is a positive integer smaller than S.

On the other hand, inputs to the FA 54b are K, i.e., 4, bit corrected pixel data, e.g., (RS4–RS7), provided from the first correction circuit 20, L, e.g., 3, bit exclusive OR operated corrected values, e.g., X4 to X6, supplied from the EX-OR gates 52e to 52g, the MSB RC7 directly applied from the memory 40, and one of the outputs from the FA 54a, e.g., a first output carry bit, e.g., Clout, as a second input carry bit, e.g., C2in, wherein the first output carry bit Clout represents a carry bit produced from a MSB, i.e., S3, of outputs of the FA 54a and L is a positive integer smaller than K.

In a preferred embodiment of the present invention, each of the outputs from the FAs, 54a, 54b, performing the adding operations for the inputs applied thereto, as is well known in the art, e.g., S0, may be defined as:

$$S0 = (X0 \oplus RS0) \oplus Clin \quad (2)$$

The remainder, i.e., S1 to S7, of the outputs from the FAs, 54a and 54b, can be derived in a similar manner as explained above since the algorithm processed therein is substantially identical to Eq. (2) except that their respective inputs are different from each other.

As can be seen from Eqs. (1) and (2), if the MSB RC7 to each of the EX-OR gates, 52a, 52g, and to the FA 54a is a logic high level, i.e., the corresponding actuator mirror is tilted in a positive direction, said FAs, 54a and 54b, carry out the adding operations for the inputs applied thereto to thereby provide 8-bit corrected output pixel data, S0 to S7, which is derived by employing the 8-bit corrected value (RC0–RC7) corresponding to the tilted angle of the actuator mirror. In this case, the 8-bit corrected output pixel data, S0 to S7, can be obtained by substantially subtracting the 7-bit exclusive OR operated corrected values, X0 to X6, supplied from the EX-OR gates, 52a to 52g, and the MSB RC7 directly applied from the memory 40 from the 8-bit corrected pixel data (RS0–RS7) provided from the first correction circuit 20, respectively.

On the other hand, if the MSB RC7 to each of the EX-OR gates, 52a to 52g, and the FA 54a are a logic low level, i.e., the corresponding actuator mirror is tilted in a negative direction, said FAs 54a and 54b perform the adding operations for the inputs applied thereto to thereby provide 8-bit corrected output pixel data, S0 to S7, which is obtained by using the 8-bit corrected value (RC0–RC7) corresponding to the tilted angle of the actuator mirror. In this case, the 8-bit corrected output pixel data, S0 to S7, can be obtained by substantially adding the 7-bit exclusive OR operated corrected values, X0 to X6, from each of the EX-OR gates, 52a to 52g, and the MSB RC7 from the memory 40 to the 8-bit corrected pixel data (RS0–RS7) from the first correction circuit 20, respectively.

Thereafter, the 8-bit corrected output pixel data S0 to S7 and a second output carry bit C2out from said FAs, 54a and 54b are coupled to the carry digit limiter 56 which is adapted for limiting extra corrected output pixel data which is not included within a predetermined pixel data range, wherein the second output carry bit C2out represents a carry bit generated from a MSB, i.e., S7, of the outputs of the FA 54b. In other words, the carry digit limiter 56 serves to generate 8-bit limited corrected output pixel data which is adapted to drive each of the actuator mirrors included in the panel provided with the AMA 200 within a predetermined supply voltage range, e.g., 0 V to 30 V, wherein the supply voltages of 0 V and 30 V represent the 8-bit pixel data of 00000000 and 11111111, respectively.

As shown in FIG. 2, the carry digit limiter 56 includes an EX-OR gate 56a, a NAND gate 56b, a plurality of OR gates, e.g., 56c to 56j, and a plurality of AND gates, e.g., 56k to 56r. Specifically, inputs to the EX-OR gate 56a are the MSB RC7 of the 8-bit corrected value from the first correction circuit 20 and the second output carry bit C2out from the FA 54b. Output from the EX-OR gate 56a may be derived in a similar manner as described in the EX-OR gates 52a to 52g.

Subsequently, the output from the EX-OR gate 56a is provided to each of the OR gates, 56c to 56j, and to the NAND gate 56b. Specifically, inputs to each of the OR gates, 56c to 56f, are the exclusive OR operated output from the EX-OR gate 56a and one of the 4-bit corrected output pixel data, S0 to S3, from the FA 54a; and, inputs to each of the OR gates, 56g to 56j, are the exclusive OR operated output from the EX-OR gate 56a and one of the 4-bit corrected output pixel data, S4 to S7, from the FA 54b. As is well known in the art, each of the OR gates, 56c to 56j, produces a logic high if all the inputs thereto are not in a logic low level; and, otherwise, it produces a logic low.

On the other hand, inputs to the NAND gate 56b are the exclusive OR operated output from the EX-OR gate 56a and the MSB RC7 from the second correction circuit 20. Output from the NAND gate 56b, as well known in the art, is a logic high if all the inputs thereto are not in a logic high level; and, a logic low if all the inputs thereto are in a logic high level.

The output from each of the OR gates, 56c to 56j, is coupled to an input port of each of the AND gates, 56k to 56r, while the output from the NAND gate 56b is coupled to another input port of each of the AND gates, 56k to 56r. As is well known in the art, each of the AND gates, 56k to 56r, produces a logic high if all inputs thereto are in a logic high level; and, otherwise, it generates a logic low. The corrected output pixel data of 8-bit so corrected, e.g., (R00–R07), is provided to a column driver (not shown) included in the AMA 200 for the driving of the actuator mirror which corresponds to the input pixel.

As may be seen from the above, if the inputs, i.e., both the MSB RC7 and the second output carry bit C2out, to the EX-OR gate 56a and the NAND gate 56b are a logic low or logic high, the 8-bit corrected output pixel data (R00–R07) from the AND gates, 56k to 56r, is identical to the 8-bit converted output pixel data, S0 to S7, generated at the FAs, 54a and 54b. But, if the MSB RC7 and the second output carry bit C2out applied to the EX-OR gate 56a and the NAND gate 56b are a logic high and a logic low, respectively, the 8-bit corrected output pixel data (R00–R07) from the AND gates, 56k to 56r, is 00000000; and, if the MSB RC7 and the second output carry bit C2out to the EX-OR gate 56a and the NAND gate 56b are a logic low and a logic high, respectively, the 8-bit corrected output pixel data (R00–R07) from the AND gates, 56k to 56r, is 11111111. As shown above, therefore, the inventive pixel data correction apparatus is capable of correcting the value of each input pixel using a predetermined corrected value of its corresponding actuated mirror in an array of M×N actuated mirrors, thereby improving the quality of the picture.

While the present invention has been described with respect to certain preferred embodiments only, other modifications and variations may be made without departing from the scope of the present invention as set forth in the following claims.

What is claimed is:

1. An apparatus, for use with an actuated mirror array (AMA) of M×N actuated mirrors, the AMA having M×N actuated mirrors, for correcting the value of an input pixel using a predetermined corrected value of its corresponding actuated mirror, which comprises:

means for gamma-correcting the value of the input pixel;

means for storing a set of corrected values for said M×N actuated mirrors, wherein the set of corrected values represent tilted directions and angles of said M×N actuated mirrors;

means for generating address data representing the location of the input pixel;

means, responsive to the generated address data for the input pixel, for retrieving a corresponding corrected value from the corrected values of the stored set, wherein the corresponding corrected value consists of S bits and S is an integer larger than 1, a most significant bit (MSB) in the S-bit corrected value being a bit denoting whether an actuated mirror corresponding to the input pixel is tilted in a positive direction or in a negative direction and the rest bits denoting the angle of a tilted actuated mirror; and means for correcting the gamma-corrected value of the input pixel using the corresponding corrected value to thereby provide a corrected output pixel value, wherein said means for correcting the gamma-corrected value includes:

means for performing exclusive OR operation for the MSB of the S-bit corrected value and each of the rest bits, respectively, to obtain a corresponding number of exclusive OR operated data; and operating means, if the MSB is a first logic level indicating that the actuated mirror corresponding to the input pixel is tilted in a positive direction, for subtracting both of the (S-1)-bit exclusive OR operated data and the MSB from the gamma-corrected value to obtain the corrected output pixel value, and, if the MSB is a second logic level indicating that the actuator mirror is tilted in a negative direction, for adding both of the (S-1)-bit exclusive OR operated data and the MSB to the gamma-corrected value to derive the corrected output pixel value.

2. The apparatus of claim 1, which further comprises means for limiting the corrected output pixel value if it is not within a predetermined pixel value range.

3. The apparatus of claim 2, wherein the predetermined pixel value range corresponds to a predetermined supply voltage range to be applied to each of the M×N actuated mirrors.

4. The apparatus of claim 3, wherein the corrected output pixel value is comprised of 8-bit with the range from 00000000 to 11111111, wherein if the corrected output pixel value is larger than 11111111, it is replaced with 11111111 and if the corrected output pixel value is less than 00000000, it is replaced with 00000000.

5. The apparatus of claim 2, wherein the limiting means includes an exclusive OR gate, a NAND gate, and a plurality of OR and AND gates.

6. The apparatus of claim 1, wherein the operating means is comprised of T number of full adders, T being a positive integer.

7. An apparatus for correcting the value of an input pixel from a video signal for use with an actuated mirror array (AMA) comprising M×N actuated mirrors, M and N being integers, said apparatus comprising:

first correction means for gamma-correcting the value of the input pixel and outputting a gamma-corrected pixel value;

means for storing a set of predetermined corrected values, each of said predetermined corrected values representing information about a corresponding one of said M×N actuated mirrors;

address generation means for generating address data representing a location of the input pixel in said video signal;

second correction means for correcting the gamma-corrected pixel value using a predetermined corrected value retrieved from said means for storing, based on said address data, wherein said predetermined corrected value retrieved from said means for storing is associated with an actuated mirror which corresponds to said location of the input pixel.

8. The apparatus of claim 7, wherein the predetermined corrected values includes information about the tilt of each of the actuated mirrors.

9. The apparatus of claim 8, wherein each of the predetermined corrected values comprises a plurality of bits, at least one of said plurality of bits indicating whether a corresponding actuated mirror is tilted in a positive direction or in a negative direction.

10. The apparatus of claim 9, wherein said plurality of bits also includes information as to an angle of tilt of said corresponding actuated mirror.

11. The apparatus of claim 7, wherein said second correction means comprises discrete logic gates and adders.

12. The apparatus of claim 7, wherein said means for storing comprises a read-only memory.

* * * * *